(12) United States Patent
Felt

(10) Patent No.: US 10,151,426 B2
(45) Date of Patent: Dec. 11, 2018

(54) ENCLOSED GUTTER CLIP

(71) Applicant: David Russel Felt, Plymouth, MN (US)

(72) Inventor: David Russel Felt, Plymouth, MN (US)

(73) Assignee: Russel Williams Home Services LLC, Maple Plain, MN (US)

( * ) Notice: Subject to any disclaimer, the term of this patent is extended or adjusted under 35 U.S.C. 154(b) by 0 days.

(21) Appl. No.: 15/067,119

(22) Filed: Mar. 10, 2016

(65) Prior Publication Data
US 2018/0245733 A1 Aug. 30, 2018

(51) Int. Cl.
| | |
|---|---|
| *F21V 21/088* | (2006.01) |
| *F16B 1/00* | (2006.01) |
| *E04D 13/064* | (2006.01) |
| *F16M 13/02* | (2006.01) |
| *F21W 121/00* | (2006.01) |
| *F21W 131/10* | (2006.01) |
| *F21S 4/10* | (2016.01) |

(52) U.S. Cl.
CPC ......... *F16M 13/022* (2013.01); *E04D 13/064* (2013.01); *F16B 1/00* (2013.01); *F21V 21/088* (2013.01); *F21S 4/10* (2016.01); *F21W 2121/004* (2013.01); *F21W 2131/10* (2013.01)

(58) Field of Classification Search
CPC ... F16M 13/022; F21V 33/006; F21V 21/088; F21V 21/0885; E04D 13/064
USPC ...... 248/200, 205.6, 229.16, 222.11, 222.12, 248/229.26, 316.7, 300 F, 231.81; 362/391, 396, 249.01, 249.04, 152
See application file for complete search history.

(56) References Cited

U.S. PATENT DOCUMENTS

| | | | | |
|---|---|---|---|---|
| 990,856 | A * | 5/1911 | Freiberg | F16M 13/02 24/343 |
| 5,566,058 | A * | 10/1996 | Protz, Jr. | F21V 21/08 362/249.09 |
| 5,581,956 | A * | 12/1996 | Fennessy | F21V 21/088 248/237 |
| 5,921,511 | A * | 7/1999 | LaPointe | F21V 21/08 248/58 |
| 6,502,958 | B1 * | 1/2003 | Chen | F21V 21/088 362/249.14 |
| 6,536,727 | B1 * | 3/2003 | Limber | F16B 2/22 248/227.1 |
| 6,572,062 | B1 * | 6/2003 | Limber | F21V 21/088 248/227.1 |

(Continued)

*Primary Examiner* — Muhammad Ijaz
(74) *Attorney, Agent, or Firm* — Greenberg Traurig, LLP; Jordan One

(57) ABSTRACT

A decorative removable lighting enclosed clip made for mounting a light to a support surface such as gutters, shingles or a building structure. The purpose of this enclosed clip is to allow an esthetically pleasing display of lights with rapid and easy installation and removal of the lighting. This eliminates falling debris from broken clips or clips that fall off the lights during the removal process. A support tab is inserted between the side portions of the structure, at longitudinally spaced intervals along the strip, and are frictionally gripped and retained by the facing side portions of the gutter, shingle or structure. The clips have enclosed end portions which support the light elements of a decorative light string along structure. The enclosed clip is capable of mounting onto a wide variety of gutters, eaves and building structures. The spacing is adjustable and provides a plurality of discrete angular positions.

16 Claims, 4 Drawing Sheets

(56) References Cited

U.S. PATENT DOCUMENTS

Figure 3:
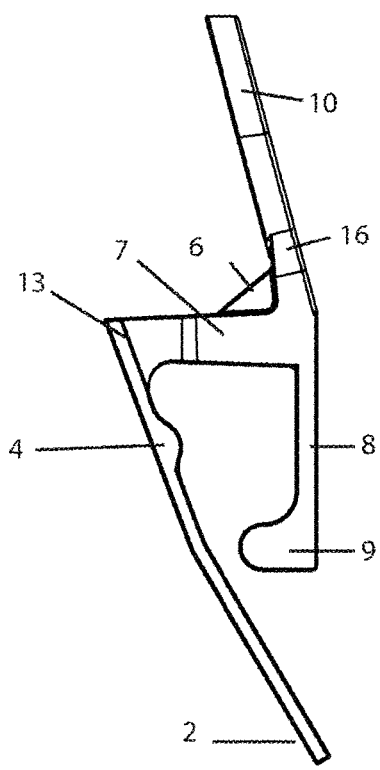

| | | | |
|---|---|---|---|
| 8,459,712 B2* | 6/2013 | Thrasher | B25B 31/00 248/219.2 |
| 8,545,041 B2* | 10/2013 | Brown | A42B 1/24 24/336 |
| 2002/0186562 A1* | 12/2002 | Schroetter | F21V 21/088 362/249.01 |
| 2006/0152927 A1* | 7/2006 | Vendrick | F21V 21/088 362/249.01 |
| 2008/0135703 A1* | 6/2008 | Craig | A47B 96/061 248/229.16 |
| 2011/0260025 A1* | 10/2011 | Aoshima | B60R 16/0215 248/231.81 |
| 2012/0241575 A1* | 9/2012 | Martinez Sanz | F24S 10/40 248/231.81 |

* cited by examiner

Fig. 1
Fig. 2
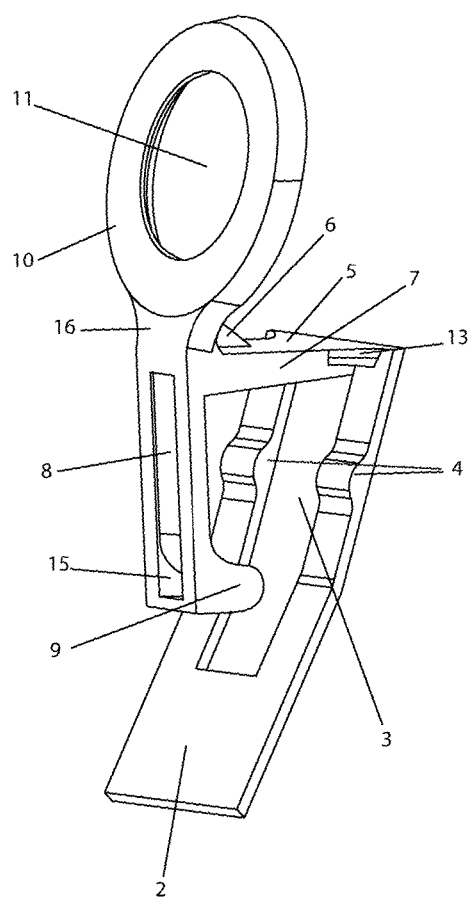
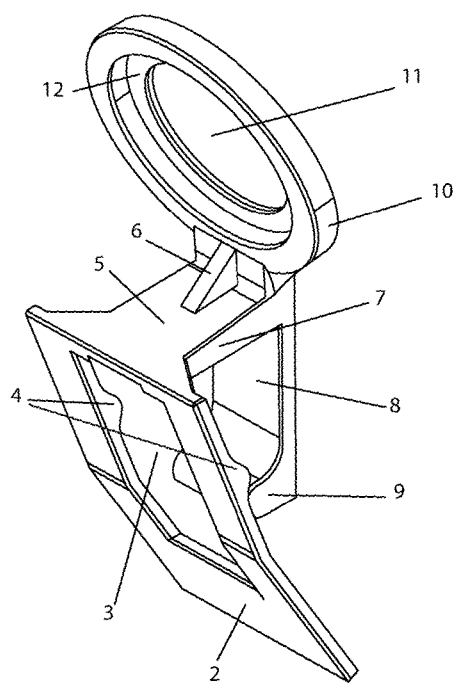

Fig. 5
Fig. 6
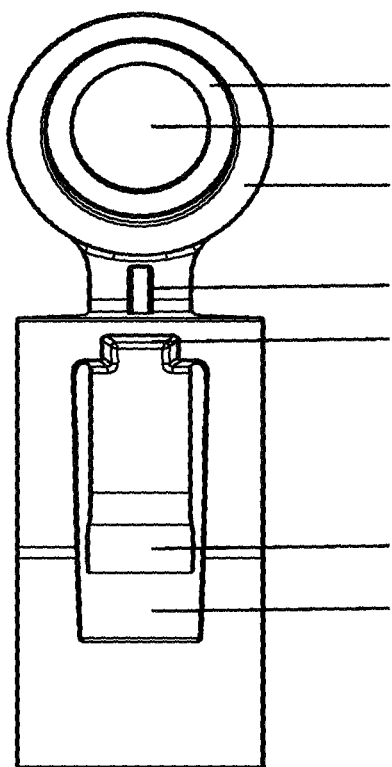
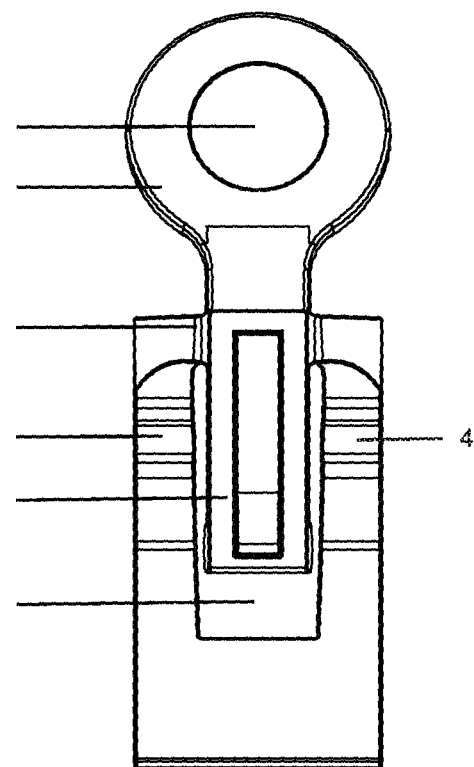

ENCLOSED GUTTER CLIP

BACKGROUND

This invention relates to attaching linear systems, decorative holiday lighting displays, ornamental light strings, misting systems and the like, to surfaces, such as gutters and other structural surfaces. It is used for attaching strands of lights and the like on the exterior of homes, buildings or other structures using an enclosed gutter clip. There are various sizes of bulbs (but not limited to) C7, C9 and mini bulbs that are positioned at different angles with respect to a roofline, gutter or other support surface. The enclosed gutter bracket accommodates bulbs of various sizes and shapes.

BRIEF SUMMARY OF THE INVENTION

It has become increasingly popular to decorate the outside of buildings, homes and other structures with lights. These lights are generally arranged as a string of lights along a power cord. Each individual light is attached to an enclosed gutter clip mounted to a gutter along a building or structure at specific intervals of space to provide a clean precise appearance. Lights are typically installed at a height that requires a ladder or lift. Installing the lights onto the gutters is very time consuming because the installer must move a ladder or lift as they install the lights across a building or structure.

A bulb is inserted thru the front of our enclosed gutter clip and screwed into the power socket from behind. It is then attached to the gutter without the use of staples, nails or any other type of fastener on the exteriors of homes, buildings or other structures while permitting bulbs to be angularly oriented with respect to the roofline at predetermined intervals at selected annular positions.

The enclosed gutter clip allows quick and efficient removal of the lights and clips simultaneously without causing any damage to the gutter line, roofline, structure or lights. By using an enclosed gutter clip you are able to remove the light strand in most instances without the use of a ladder or lift avoiding leaving behind broken gutter clips in the gutters themselves, on the roofline or on the ground.

The invention consists of certain novel features and a combination of parts hereinafter fully described, illustrated in the accompanying drawings and particularly pointed out in the appended claims, it being understood that various changes in the details may be made without departing from the spirit, or sacrificing any of the advantages of the present invention.

BRIEF DESCRIPTIONS OF THE DRAWINGS

Figure 4:
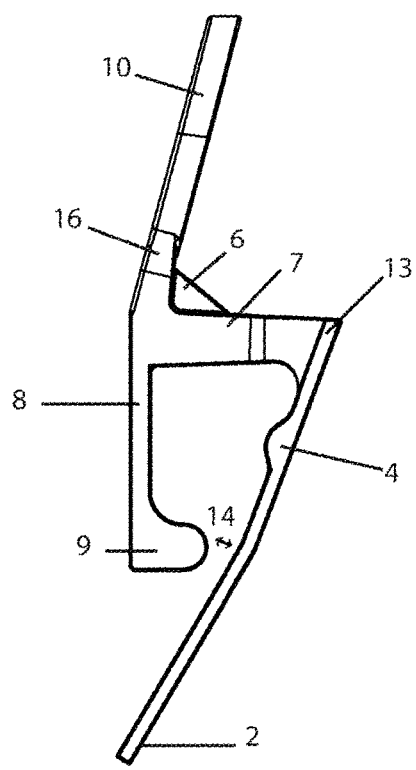
Figure 7:
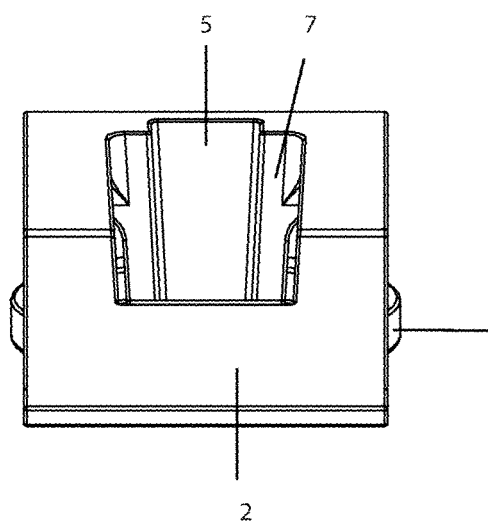
Figure 8:
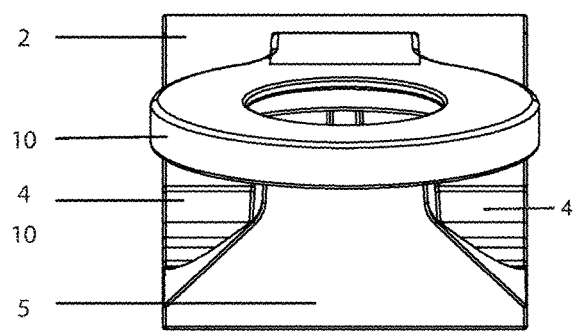

For the purpose of facilitating an understanding of the invention, there is illustrated in the accompanying drawings FIG. 1 illustrates a perspective front view of the present invention FIG. 2 illustrates a perspective back view of the present invention FIG. 3 illustrates a side view of the present invention FIG. 4 illustrates a second side view of the present invention FIG. 5 illustrates a back view of the present invention FIG. 6. illustrates a front view of the present invention FIG. 7. Illustrates a bottom view of the present invention FIG. 8. Illustrates a top view of the present invention

DETAILED DESCRIPTION AND BEST MODE OF IMPLEMENTATION

The present invention shown in FIG. 1 is an enclosed gutter clip 1 having a hollowed rectangular shaped body 2. This body 2 has a slight protrusion 4 that secures body 2 on the structure, providing counter pressure on the body 2 portion side of the clip 1, and opposing pressure on strut 7, cantilever 8, and lobe 9. The protrusions 4 are not required but are useful in providing stability for the function of the clip 1; they provide extra structure to ensure the clip 1 is secure at a 90° angle. Bracket 5 and strut 7 connect to cantilever 8 perpendicularly, forming a 90° angle between cantilever 8, side 5, strut 7 and a 75° angle between body 2 and strut 7, bracket 5. The clip 1 as shown in FIG. 1 is how the clip will generally (but not always) be positioned vertically on the outer edge of a structure. Cantilever 8 is on the outside of a structure or the top of a shingle and body 2 provides pressure on the opposite side of the gutter edge or shingle.

The clip 1 is designed so that the protrusion 4 and cantilever 8 provide pressure on opposite sides of the gutter with the weight of the clip resting on top of the gutter edge on bracket 5. The body 2 below protrusion 4 provides extra pressure and stability for the clip 1. The bulb will be inserted through hole 11 on the front part of the outer flange 10 and screwed into the light socket that will be on the back side of the clip and within the socket guide ridge 12 (see FIG. 2). Outer flange 10 is supported by neck gusset 6 so that it is ridged and does not flex or move. Strut gusset 13 is to provide stability to the body 2 as it provides pressure against the surface opposition of cantilever 8. Socket guide ridge 12 could increase in thickness if preferred. The body 2 is designed to be longer than strut 7 for quicker installation on gutters, eaves or other structures. This area can be lengthened or shortened to accommodate size variances if needed. The neck 16 can be adjusted with neck gusset 6 if desired.

Hole 3 and opening 15 are unessential to the performance or functionality of the invention and are solely used for efficiency in the production of the clip. Opening 15 is to thin out cantilever 8 for the purpose of using less plastic and also to prevent clotting of the plastic as it flows through the dye tool. Strut 7 is indented on the bottom side of bracket 5 to reduce plastic and also to prevent clotting as the plastic flows through the dye tool. Hole 3 reduces plastic needed to create the clip and also allows the dye tool to move through hole 3 to create cantilever 8 with ease.

In order to place the clip 1 on the gutter, eaves or other structure, position the clip below the structure and push upward causing the ends to flex apart. Another way of attaching the clip 1 is to tilt the clip shown in FIG. 2 at an angle such that body 2 engages the structure and apply pressure.

One advantage of the present clip is that the clip 1 can flex to some extent to accommodate the gutter, eaves or structure. The present preferred clip has a standard distance 14 (see FIG. 4) of approximately ⅛ inch between body 2 and lobe 9 when clip 1 is attached to a gutter, eaves or other structure and is in a relaxed condition. The opposing ends of clip 1, i.e., body 2, cantilever 8 and lobe 9, can be pulled apart such that the distance 14 would be as much as 2 inches to accommodate the width of the gutter, eaves or shingles. Thus, the present clip can be fitted over structures from approximately ⅛ inch to 2 inches. When placed on a gutter, eaves, shingles or other structure, the protrusions 4 provide optional support in holding clip 1 in place.

The present clip is designed primarily for use on the eaves, gutters or shingles of a house; but, its use is not so limited.

Although I have described and illustrated certain present preferred embodiments of my clip it should be distinctly understood that the invention is not limited thereto, but may be variously embodied within the scope of the following claims.

Cables, wires, strands and alternate objects could rest on FIG. 3 and FIG. 4, bracket 5 and outer flange 10 to prevent it from falling.

The bulb holder section includes the outer flange 10 and a hole 11 which can vary in size based on the size of the bulb.

Referring to FIG. 1, the clip 1 may be formed from a synthetic resin and it is a one piece construction. The clip 1 is made from a resin which may be an acrylic, a polycarbonate, a nylon, a polyethylene or polypropylene or mixtures thereof. The resin material is made to withstand cold temperatures to eliminate breaking clips.

I claim:

1. A clip comprising:
an elongated body having a first end, a second end, and at least one protrusion extending from a surface of the elongated body;
a strut having a first end and a second end, wherein the first end of the strut is rigidly connected to the second end of the elongated body, and wherein the first end of the strut and the second end of the strut collectively define a strut axis;
a cantilever having a first end and a second end, wherein the first end of the cantilever is rigidly connected to the second end of the strut;
a substantially circular bulb holder rigidly connected to and extending from the first end of the cantilever in a direction substantially opposite the second end of the cantilever, wherein the bulb holder includes a hole configured to receive at least a portion of a bulb, wherein the hole has central axis extending therethrough that is substantially parallel to the strut axis; and
a neck situated between and rigidly connecting the cantilever and the bulb holder,
wherein the second end of the cantilever is resiliently capable of being pulled away from the elongated body to accommodate the positioning of a structure between the at least one protrusion of the elongated body and the cantilever, and the clip is made from a substantially resilient material having a memory that causes the second end of the cantilever to return toward a relaxed position when not subject to an external force, and
wherein, when the structure is situated between the at least one protrusion of the elongated body and the cantilever, the memory causes the second end of the cantilever to return toward the relaxed position, such that the cantilever and the at least one protrusion of the elongated body exert pressure on the structure, to thereby maintain the position of the clip about the structure.

2. The clip of claim 1, wherein the bulb holder has a front side and a back side, and wherein the bulb holder further comprises:
an annular outer flange on the front side of the bulb holder having an inner radius and an outer radius, wherein the annular outer flange is continuous, and wherein the hole is within the inner radius of the annular outer flange; and
a socket guide ridge on the back side of the bulb holder having an inner radius and an outer radius,
wherein the inner radius of the annular outer flange and the inner radius of the socket guide ridge are aligned, wherein the length of the outer radius of the socket guide ridge is less than the length of the outer radius of the annular outer flange, and
wherein the hole is configured to receive a threaded end of the bulb and the socket guide ridge is configured to abut a bulb socket such that, when the threaded end of the bulb is screwed into the bulb socket, the bulb holder securely supports the bulb.

3. The clip of claim 1, wherein the cantilever comprises a lobe extending from the second end of the cantilever toward the elongated body.

4. The clip of claim 1, wherein the structure is a gutter.

5. The clip of claim 1, wherein the structure is an eave.

6. The clip of claim 1, wherein the structure is a shingle.

7. The clip of claim 1, wherein a distance between the second end of the cantilever and the elongated body is approximately ⅛ inch when the cantilever is in the relaxed position.

8. The clip of claim 7, wherein the second end of the cantilever is capable of being pulled away from the elongated body such that the distance between the second end of the cantilever and the elongated body is approximately 2 inches.

9. The clip of claim 1, wherein the bulb is a C9 bulb.

10. The clip of claim 1, wherein the bulb is a C7 bulb.

11. The clip of claim 1, wherein the substantially resilient material is a synthetic resin material.

12. The clip of claim 11, wherein the synthetic resin material comprises one or more of an acrylic, a polycarbonate, a nylon, a polyethylene, and a polypropylene.

13. The clip of claim 1, wherein the clip is integrally formed as a one piece construction.

14. The clip of claim 1, wherein the at least one protrusion comprises a first protrusion and a second protrusion, wherein a central portion of the elongated body includes a substantially rectangular hole, and wherein the first protrusion and the second protrusion are horizontally aligned on opposite sides of the substantially rectangular hole.

15. The clip of claim 1, wherein the clip further comprises at least one strut gusset rigidly connected to the strut and the elongated body.

16. The clip of claim 1, wherein the clip further comprises a neck gusset rigidly connected to the strut and the bulb holder.

* * * * *